US012700012B2

(12) United States Patent (10) Patent No.: US 12,700,012 B2
Inan et al. (45) Date of Patent: Aug. 4, 2026

(54) SYSTEMS AND METHODS FOR PROVIDING CUSTOMER INSIGHTS

(71) Applicant: Walmart Apollo, LLC, Bentonville, AR (US)

(72) Inventors: Aysenur Inan, Mountain View, CA (US); Vivek Vaidyanathan, Sunnyvale, CA (US); Sooraj Mangalath Subrahmannian, San Jose, CA (US); Divya Chaganti, San Jose, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 307 days.

(21) Appl. No.: 17/560,874

(22) Filed: Dec. 23, 2021

(65) Prior Publication Data
US 2023/0206253 A1      Jun. 29, 2023

(51) Int. Cl.
G06Q 30/0201 (2023.01)
(52) U.S. Cl.
CPC ................................ G06Q 30/0201 (2013.01)
(58) Field of Classification Search
None
See application file for complete search history.

(56) References Cited

U.S. PATENT DOCUMENTS 6,029,195 A * 2/2000 Herz ................ H04N 21/25891
348/E7.071
6,553,350 B2 * 4/2003 Carter .................... G06Q 30/06
705/20

9,785,953 B2 10/2017 Desal et al.
10,572,886 B2 * 2/2020 Nguyen ............. G06Q 30/0623
10,977,907 B1 4/2021 Zalewski et al.
(Continued)

FOREIGN PATENT DOCUMENTS

WO WO-2006065503 A2 * 6/2006 ........... H04L 69/329

OTHER PUBLICATIONS

Mekonnen et al, Linking products to a cause or affinity group, European Journal of Marketing 42 No. 1-2, pp. 135-153, 2008 https://www.researchgate.net/publication/48991256 (Year: 2008).*
(Continued)

*Primary Examiner* — Patricia H Munson
(74) *Attorney, Agent, or Firm* — Morgan, Lewis & Bockius LLP; Manita Rawat

(57) ABSTRACT

This application relates to apparatus and methods for automatically determining and providing digital customer insights based on historical customer data. In some examples, a computing device obtains user data for a user. In response, the computing device receives a plurality of product types relevant to the user and their corresponding relevance scores. For each product type, the computing device then receives a set of attributes, where each attribute is associated with an affinity score for the user. The computing device determines, for each product type, an overall score for each attribute and product type pair based on the relevance score for the product type and the affinity score for the corresponding attribute. At least one attribute and product type pair is presented to the user based on the corresponding overall score.

20 Claims, 8 Drawing Sheets

(56)     References Cited

U.S. PATENT DOCUMENTS

| | | | |
|---|---|---|---|
| 11,113,745 B1 * | 9/2021 | Cetintas ............. | G06Q 30/0625 |
| 2005/0251408 A1 * | 11/2005 | Swaminathan .... | G06Q 30/0269 |
| | | | 705/14.1 |
| 2011/0153423 A1 * | 6/2011 | Elvekrog .......... | G06Q 30/0255 |
| | | | 705/14.66 |
| 2011/0288935 A1 * | 11/2011 | Elvekrog .......... | G06Q 30/0241 |
| | | | 705/14.53 |
| 2012/0095837 A1 * | 4/2012 | Bharat .............. | G06Q 30/0256 |
| | | | 705/14.54 |
| 2013/0097052 A1 * | 4/2013 | Dicker .............. | G06Q 30/0253 |
| | | | 705/26.7 |
| 2014/0207611 A1 | 7/2014 | Cleary et al. | |
| 2014/0244399 A1 * | 8/2014 | Orduna ............. | G06Q 30/0241 |
| | | | 705/14.66 |
| 2017/0286977 A1 * | 10/2017 | Allen ................ | G06Q 30/0254 |
| 2018/0240158 A1 | 8/2018 | Peng | |
| 2019/0080383 A1 * | 3/2019 | Garcia Duran .... | G06Q 30/0631 |
| 2020/0334635 A1 * | 10/2020 | Busey ...................... | G06N 5/02 |
| 2021/0201359 A1 | 7/2021 | Sekar et al. | |
| 2022/0051292 A1 * | 2/2022 | Flowers ................. | G06F 17/18 |
| 2022/0277345 A1 * | 9/2022 | Nag ........................ | G06N 20/00 |
| 2025/0356435 A1 * | 11/2025 | Muthu ................... | G06Q 10/40 |

OTHER PUBLICATIONS

Brandan Artley, Training a Neural Network by Hand, towardsdatascience webpages, Jun. 23, 2022 https://towardsdatascience.com/training-a-neural-network-by-hand-1bcac4d82a6e (Year: 2022).*

* cited by examiner

500

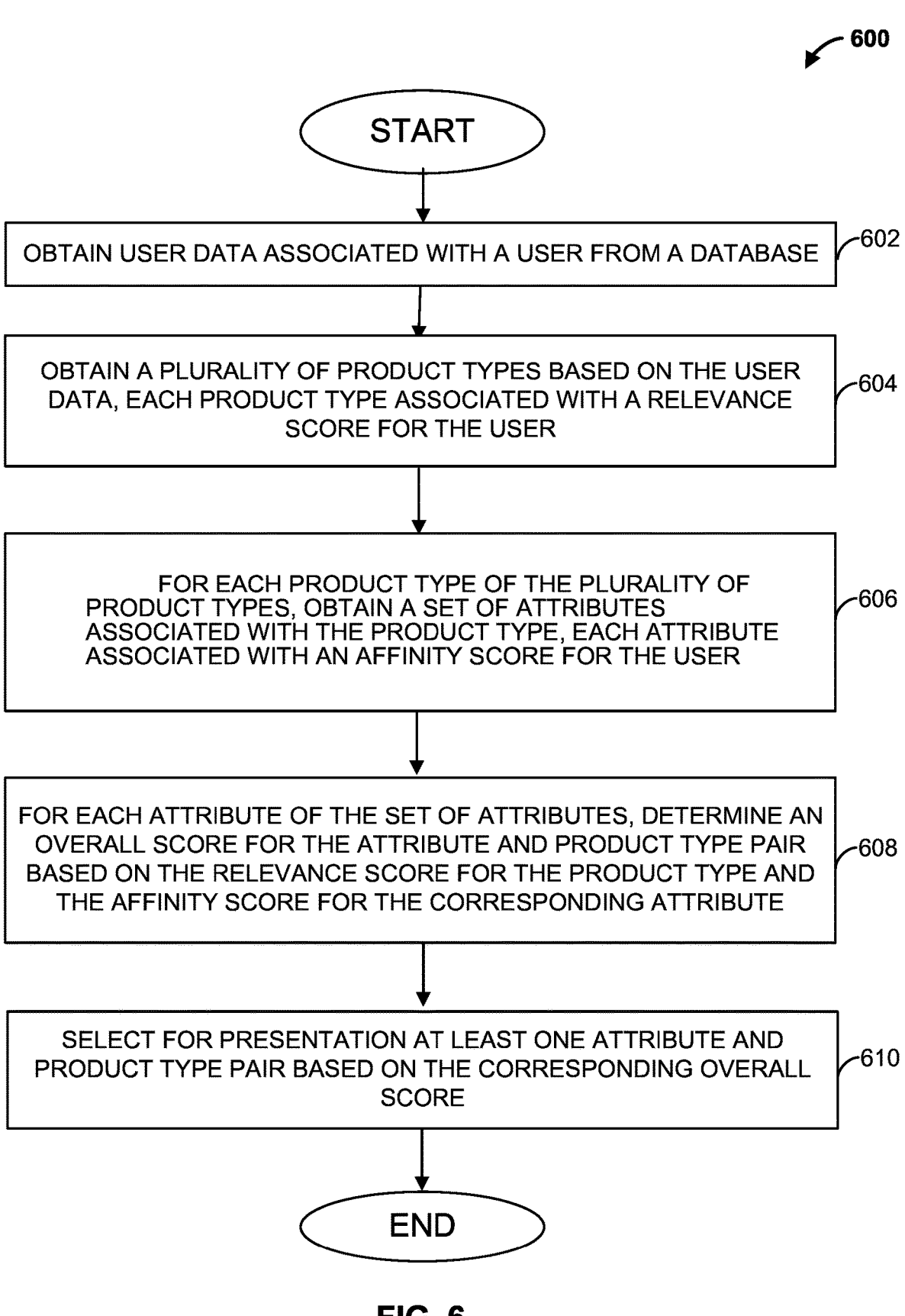

600

START

OBTAIN USER DATA ASSOCIATED WITH A USER FROM A DATABASE —602

OBTAIN A PLURALITY OF PRODUCT TYPES BASED ON THE USER DATA, EACH PRODUCT TYPE ASSOCIATED WITH A RELEVANCE SCORE FOR THE USER —604

FOR EACH PRODUCT TYPE OF THE PLURALITY OF PRODUCT TYPES, OBTAIN A SET OF ATTRIBUTES ASSOCIATED WITH THE PRODUCT TYPE, EACH ATTRIBUTE ASSOCIATED WITH AN AFFINITY SCORE FOR THE USER —606

FOR EACH ATTRIBUTE OF THE SET OF ATTRIBUTES, DETERMINE AN OVERALL SCORE FOR THE ATTRIBUTE AND PRODUCT TYPE PAIR BASED ON THE RELEVANCE SCORE FOR THE PRODUCT TYPE AND THE AFFINITY SCORE FOR THE CORRESPONDING ATTRIBUTE —608

SELECT FOR PRESENTATION AT LEAST ONE ATTRIBUTE AND PRODUCT TYPE PAIR BASED ON THE CORRESPONDING OVERALL SCORE —610

END

FIG. 6

SYSTEMS AND METHODS FOR PROVIDING CUSTOMER INSIGHTS

TECHNICAL FIELD

The disclosure relates generally to digital insights and, more specifically, to electronically determining and providing digital customer insights including customer specific recommendations, favorites, and preferences.

BACKGROUND

At least some websites, such as retailer websites (e.g., e-commerce platforms), display item recommendations including relevant items (e.g., advertisements). For example, a website may display item recommendations, and may further allow a customer to purchase recommended items. The displayed recommendations may be determined by recommendation systems, which may attempt to provide recommendations for items which the customer may be interested in. Often, the recommendations are commonly determined and generated for all customers of the retailer as a whole. However, at least some customers have established shopping habits for particular time frames during specific days, weeks, months, or years. When provided non-personalized recommendations, the customers may lose interest when presented with the same recommended items that are of little interest to the customer, as they experience churn due to lack of engagement with their preferred products. This may lead to decreased customer engagement when the user might be more inclined to interact with items that are more in line with the user's interests. In this way, in some examples, the item recommendation systems may provide recommendations for items that the customer finds irrelevant or is not interested in or may provide recommendations for the same items repeatedly, and thus, decreasing the user's satisfaction with the browsing session and decreasing a likelihood of a purchase by the user in the future that may be avoided with a more robust approach to presenting the user with insights that indicate that the retailer understands the user on an individual level. As such, there are opportunities to address item recommendation systems and the associated churn problem, particularly related to understanding the customer and providing related personalized customer insights, including, customer preferences, favorites, etc., to maximize customer engagement with the website and to improve customer experience as a result of the increased engagement.

SUMMARY

The embodiments described herein are directed to automatically determining and providing digital customer insight with learned customer preferences and behaviors for display, for example, on a website or via an email notification. The embodiments may allow a person, such as a customer, to be presented with customer insights, including customer preferences, customer favorites, and personalized recommendations, that may be more likely to interest the customer based on learned habits of the specific customer. For example, the embodiments may allow the person to view their savings, recent purchases, affinity to certain attributes and products, etc. based on machine learning methods applied to the customer's historical purchases, transactions and interactions with the website. In some examples, the embodiments may leverage the customer's buying habits to determine the customer's preferences for different product types and corresponding attributes (E.g., brand, dietary preferences, flavor, price, etc.) and provide the customer with a combination of such insights unique to the customer in order to create additional customer engagement with the website. In some examples, the insights are personalized to each person, e.g., the product types and attributes presented are personalized to each person. As a result, the embodiments may allow a retailer to present more relevant insights and recommendations to each person, thereby increasing the potential traffic to the website, and in turn, increasing the customer satisfaction with the website. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain user data associated with a user from a database. The computing device is configured to obtain a plurality of product types based on the user data. Each product type is associated with a relevance score for the user. The computing device is further configured to, for each product type of the plurality of product types, obtain a set of attributes associated with the product type. Each attribute is associated with an affinity score for the user. Additionally, the computing device is configured to, for each attribute of the set of attributes, determine an overall score for the attribute and product type pair based on the relevance score for the product type and the affinity score for the corresponding attribute. The computing device is also configured to select for presentation at least one attribute and product type pair based on the corresponding overall score.

In some embodiments, a method is provided that includes to obtaining user data associated with a user from a database. The method also includes obtaining a plurality of product types based on the user data. Each product type is associated with a relevance score for the user. The method further includes obtaining, for each product type of the plurality of product types, a set of attributes associated with the product type. Each attribute is associated with an affinity score for the user. Further, the method includes determining, for each attribute of the set of attributes, an overall score for the attribute and product type pair based on the relevance score for the product type and the affinity score for the corresponding attribute. The method also includes selecting for presentation at least one attribute and product type pair based on the corresponding overall score.

In yet other embodiments, a non-transitory computer readable medium has instructions stored thereon, where the instructions, when executed by at least one processor, cause a computing device to perform operations that include obtaining user data associated with a user from a database. The operations include obtaining a plurality of product types based on the user data. Each product type is associated with a relevance score for the user. The operations also obtaining, for each product type of the plurality of product types, a set of attributes associated with the product type. Each attribute is associated with an affinity score for the user. The operations further include determining, for each attribute of the set of attributes, an overall score for the attribute and product type pair based on the relevance score for the product type and the affinity score for the corresponding attribute. Further, the operations include selecting for presentation at least one attribute and product type pair based on the corresponding overall score.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 6 is a flowchart of an example method that can be carried out by the customer insight computing device of FIG. 1 in accordance with some embodiments.

DETAILED DESCRIPTION

Figure 1:
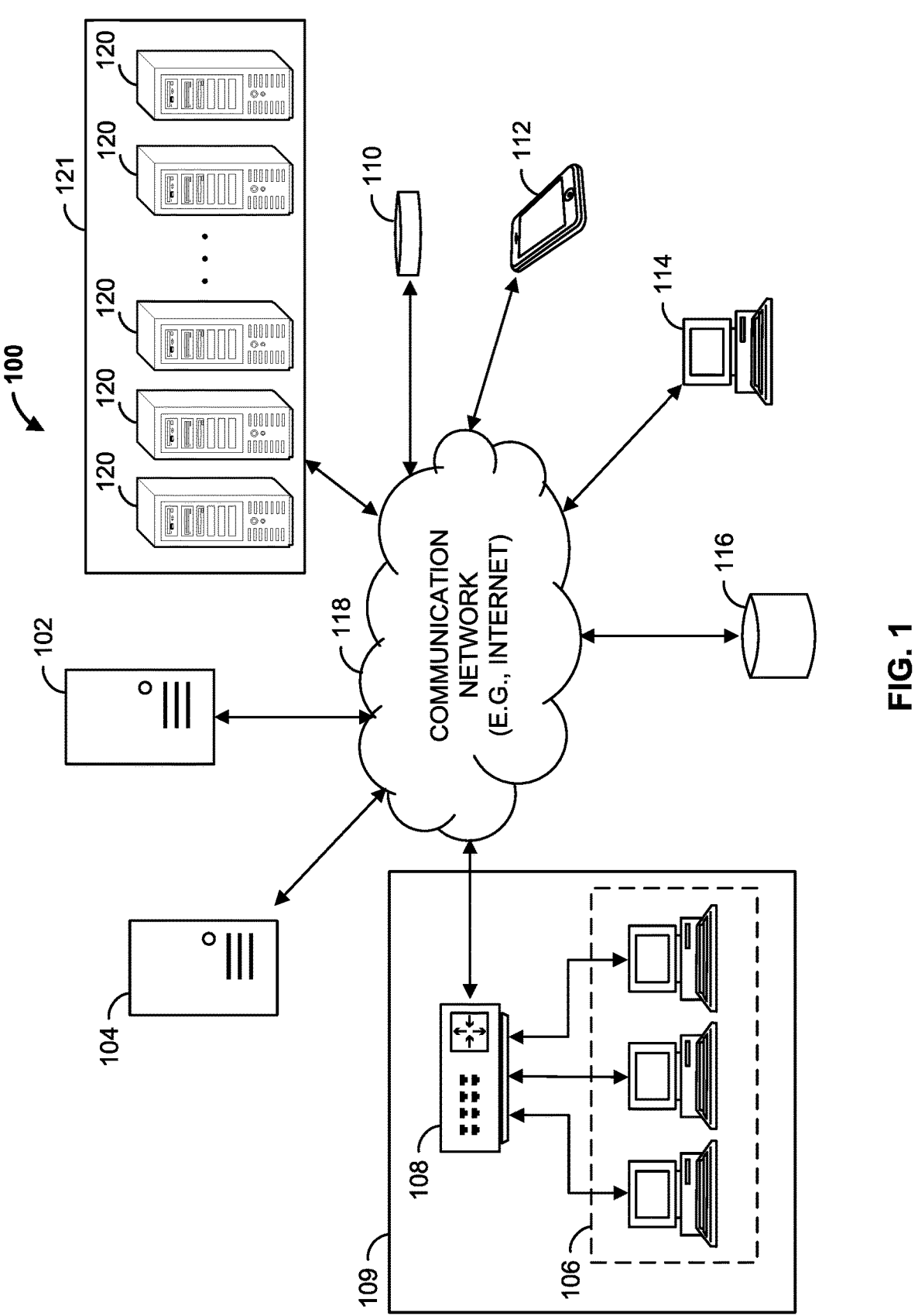
FIG. 1 is a block diagram of a customer engagement system that includes a customer insight computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a customer engagement system 100 that includes a customer insight computing device 102 (e.g., a server, such as an application server), a web server 104, one or more processing devices 120, workstation(s) 106, database 116, and one or more customer computing devices 110, 112, 114 operatively coupled over network 118. Customer insight computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of customer insight computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to customer insight computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, customer insight computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with customer insight computing device 102 over communication network 118. The workstation(s) 106 may send data to, and receive data from, customer insight computing device 102. For example, the workstation(s) 106 may transmit data identifying items purchased by a customer at store 109 to customer insight computing device 102.

Although FIG. 1 illustrates three customer computing devices 110, 112, 114, customer engagement system 100 can include any number of customer computing devices 110, 112, 114. Similarly, customer engagement system 100 can include any number of customer insight computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view item recommendations for items displayed on the website, and may click on item advertisements, for example. The website may capture these activities as user session data, and transmit the user session data to customer insight computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to customer insight computing device 102.

In some examples, customer insight computing device 102 may execute one or more models (e.g., algorithms), such as a machine learning model, statistical model, logarithmic model, language model, etc., to determine customer insights to advertise to the customer (i.e., item recommendations, customer preferences, customer favorites, product type recommendations, etc.). Customer insight computing device 102 may transmit the customer insights to web server 104 over communication network 118, and web server 104 may display advertisements for one or more of the customer insights on the website to the customer. For example, web server 104 may display the customer insights to the customer on a homepage, a catalog webpage, an item webpage, an email page, a profile page, or a search results webpage of the website (e.g., as the customer browses those respective webpages).

In some examples, web server 104 transmits an insight request (e.g., search request, recommendation request) to customer insight computing device 102. The insight request may identify a customer needing insight, a recommendation or search query provided by the customer (e.g., via a search bar of the web browser), or an insight query provided by a processing unit in response to determining that a customer has engaged with the a retailer's website and/or store for a threshold amount of time (e.g., two weeks) and/or determining that the customer has conducted a number of transactions lower than a threshold (e.g., five times) within a specific period of time (e.g., one month). The processing unit may be a part of the web server 104 or a processor of customer insight computing device 102. In response to receiving the request, customer insight computing device 102 may execute the one or more processors to determine insight results and/or recommendation results to display to the customer (i.e., product type recommendations, item recommendations, customer favorites, customer preferences, etc.). Customer insight computing device 102 may transmit the results to web server 104 over communication network 118. Web server 104 may display the results on a results webpage, provide it as an email to the customer via customer email, for example.

Customer insight computing device 102 is further operable to communicate with database 116 over communication network 118. For example, customer insight computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to customer insight computing device 102, in some examples, database 116 can be a local storage device, such as a hard drive, a non-volatile memory, or a USB stick. Customer insight computing device 102 may store purchase data received from web server 104 in database 116. Customer insight computing device 102 may also receive from web server 104 user session data identifying events associated with browsing sessions, and may store the user session data in database 116.

In some examples, customer insight computing device 102 generates feature vectors for a plurality of models (e.g., machine learning models, statistical models, algorithms, etc.) based on item catalog data, historical user session data, purchase data, and/or current user session data for the customer and/or items. Customer insight computing device 102 trains the models based on their corresponding feature vectors, and customer insight computing device 102 stores the models in a database, such as in database 116 (e.g., cloud storage).

The models, when executed by customer insight computing device 102, allow customer insight computing device 102 to determine personalized customer insights to advertise to a customer. For example, customer insight computing device 102 may obtain the models from database 116. Customer insight computing device 102 may determine that a customer requires customer insights. In some examples, customer insight computing device 102 may receive, in real-time from web server 104, current user session data identifying real-time events of the customer interacting with a website (e.g., during a browsing session). In response to receiving the user session data, customer insight computing device 102 may execute the models to determine customer insights for items (e.g., sponsored items and non-sponsored items) to display to the customer.

In other examples, customer insight computing device 102 may determine that a customer requires customer insights based on determining that the customer has not been engaged with retailer's website and/or store in the recent past. For example, customer insight computing device 102 may access a customer's data (e.g., user data), including customer purchase data, customer historical session data, to determine that the customer is an engaged customer (e.g., based on a criteria) but has not made recent purchases on and/or recently engaged with the retailer's platforms (e.g., online platforms, websites, applications, stores, etc.). For example, customer insight computing device 102 may determine that a customer is an engaged customer based on a set of rules. The set of rules may include, without limitation, one or more of a minimum number of transactions conducted during a threshold time period (e.g., five transaction in the last three months), a maximum amount of time between consecutive transactions (e.g., 10 days between consecutive transactions), etc. Upon determining one or more engaged customers, customer insight computing device 102 may determine a subset of the engaged customers that have not engaged (e.g., logged in, purchased an item, explored the website, etc.) with the retailer's platforms (e.g., websites, online platforms, ecommerce application, stores, etc.) recently (e.g., within a threshold amount of time). For example, customer insight computing device 102 may determine that a customer is an engaged customer but has not engaged with the retailer's platform(s) within the last threshold amount of times (e.g., last five days). In response to determining that the engaged customer has not engaged with the retailer's platform(s) within the last threshold amount of time, customer insight computing device 102 may determine to generate customer insights for the customer. In some examples, customer insight computing device 102 may determine previously engaged customers to generate customer insights on a periodic basis (e.g., every day, every week, etc.). In other examples, customer insight computing device 102 may determine in real-time to generate customer insights for a previously engaged customer when the customer has been inactive or not engaged with a retailer's platform within the threshold period of time.

In some examples, customer insight computing device 102 may receive user session data from web server 104. The user session data may identify actions (e.g., activity) of the customer on a website. For example, the user session data may identify item impressions, item clicks, items added to an online shopping cart, conversions, click-through rates, item recommendations viewed, and/or item recommendations clicked during an ongoing browsing session (e.g., the user data identifies real-time events). Customer insight computing device 102 may generate customer insights based on the user session data, historical user data (e.g., historical user transaction data, historical user purchase data, historical user engagement data), potential revenues for items (e.g., cost-per-click values), potential profit margins items, and/or item catalogs. For example, customer insight computing device 102 may determine relevant product types for a customer as an initial matter based on relevance of the corresponding product types to the customer (e.g., based on user session data, historical user data). The product types may be ranked based on the historical user data. The customer insight computing device 102 may then determine or obtain attributes (e.g., brand, flavor, color, size, dietary features, type, price, etc.) of the product types from item catalogues, and similarly, may determine or obtain customer affinity scores for each attribute for each product type. The customer affinity scores for the attributes may be determined based on historical customer data (e.g., engagement data, session data, purchase data, etc.). The customer affinity score for an attribute may represent a customer's preference or relevance for the attribute. Customer insight computing device 102 may then determine overall scores for each attribute and product type pair based on the correspond product type relevance score and the customer affinity score for the attribute. The attribute and product type pair with the highest score for a product type may then be selected for presentation to the customer as a customer insight. In this way, the most relevant information regarding the customer may be used to build customer insights including statistics and insights unique to the customer, as determined based on the customer's habits as gleaned from the customer's historical purchase and engagement data.

In some examples, the tensors are generated based on semantic similarities between the items. For example, customer insight computing device 102 may generate the tensors based on a universal sentence encoding using a semantic similarity model that encodes and embeds item attributes such as title, brand, flavor, size, dietary features, etc. (e.g., metadata) of the items as extracted by analyzing the catalogs for each item. For example, customer insight computing device 102 may generate the tensors based on catalog data for all items for all product types as stored in database 116.

In some examples, customer insight computing device 102 may also generate tensors based on semantic similarities between product types (e.g., snack chips, milk, pasta sauce, pizza, pasta, juice, bread, laptops, area rugs, television stands, etc.). The tensors may be used to rank and score all product types based on relevancy to the customer based on historical user data. The initial set of product types for customer insights may then be determined using the relevancy scores. In some examples, customer insight computing device 102 may also generate tensors based on semantic similarities between attributes (e.g., brand, flavor, dietary features, type, size, etc.) of products within the product type based on the historical user data. The tensors may be used to re-rank and re-score the product types based on relevancy of the attributes for the product type for the customer. A subset of the product types may be selected as relevant product types for the particular customer. In some examples, product types with a score (e.g., re-score) higher than a threshold (e.g., 0.5) may be selected as relevant product types. In other examples, a threshold number of highest ranked (e.g., re-ranked) product types may be selected as relevant product types (e.g., top five ranked product types).

Customer insight computing device 102 may predict the customer's affinity towards a given attribute associated with a product type of the relevant product types based on the historical user data. Each attribute may be associated with an affinity score indicating the customer's preference towards the attribute. In some examples, a machine learning model may be used to determine a customer's affinities to respective attributes of products and/or product types based on the historical user data. For each of the relevant product types, customer insight computing device 102 may determine and/or obtain (e.g., from database 116) affinity score for each attribute of the corresponding product type. Further, customer insight computing device 102 may determine, for each attribute and product type (e.g., relevant product type) pair, an overall score associated with the customer based on the affinity score for the attribute and the relevance score for the corresponding product type. The pairs with the highest score(s) may be determined to be included in the customer insights for the customer. In some examples, the overall score for an attribute and product type pair may be a product of the relevance score of the product type and the affinity score of the corresponding attribute.

Customer insight computing device 102 may provide the tensors (e.g., embeddings) as required by each machine learning model. The machine learning models may include, for example, neural networks, deep neural networks, decision tree models, regression models, random forest models, statistical models, stochastic models, or any other suitable models.

In some examples, customer insight computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units.

Based on the output of the models, customer insight computing device 102 may generate customer insight for the customer (e.g., based on the highest ranked and/or scored attribute and product type pairs) to be advertised on the website and/or via an email. For example, customer insight computing device 102 may transmit the customer insights to web server 104, and web server 104 may display the recommend items to the customer.

For example, customer insight computing device 102 may cause for presentation the customer insights including the selected top attribute and product type pairs to the customer via a user interface. In some examples, customer insight computing device 102 may generate an email notification to the customer, using an email identifier associated with the customer, including the customer insights. In other examples, the email notification may include a link to a webpage associated with the retailer, and the webpage may cause to present the customer insights when selected by the customer. In some examples, the customer insights may include the scores and/or other statistics associated with each of the selected top attribute and product type pairs.

Customer insight computing device 102 may store the customer insights in database 116 in association with the customer (e.g., user), for example, in association with a customer identifier of the customer. Customer insight computing device 102 may use the customer insights to determine the customer's shopping habits, such as, attribute preferences for relevant product types, the associated scores, etc. In some examples, customer insight computing device 102 may use the customer insights to additionally generate item recommendations for the customer based on the attribute preferences for relevant product types, for example, based on the items more frequently interacted with by the customer or more frequently purchased, and recommend them for repurchasing. In some examples, customer insight computing device 102 may determine customer insights based on seasonal purchases made by the customer during holidays and/or events. In such examples, customer insight computing device 102 may take into account the current time of the year and compare it to historical purchases of the customer during a similar time period within previous years. The customer insights may be stored in database 116 and may be periodically updated.

In some examples, customer insight computing device 102 may train a machine learning model to determine the customer insights (e.g., customer preferences for brand, flavor, color, dietary preferences based on user data (e.g., historical user purchase data, historical user engagement data, historical user session data, etc.). For each previously engaged customer of the retailer, the machine learning model may determine an overall score for an attribute and product type pair as follows:

$$prod_i = e_{pt} * e_{pt}^a$$

Where a denotes the attribute, $e_{pt}$ denotes a product relevance score for customer e for the product type pt, and $$e_{pt}^a$$

denotes attribute affinity score for attribute a of product type pt for customer e.

The customer insights may then be generated using portion of the selected attribute and product type pairs based on formats for different types of insights. The customer insights may then be presented to the customer in the determined formats.

Among other advantages, the embodiments allow for real-time inferencing of multiple models to generate customer insights for a particular customer including unique statistics and insights gained based on the most relevant information learned from historical user data. The customer insights presented to the customer may further allow the customer to view insights gained from their personal shopping habits and preferences, which may perhaps not have previously been easily comprehensible to the customer, which in turn, may create additional customer engagement and activity within the retailer's platform by increasing the customer's curiosity and providing easily understandable platform for the customer to find preferred products for purchase in an easy to use environment. Further, distributing processing tasks, based on previously trained and saved embeddings, allows for more consistent throughput consistency, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data).

Figure 2:
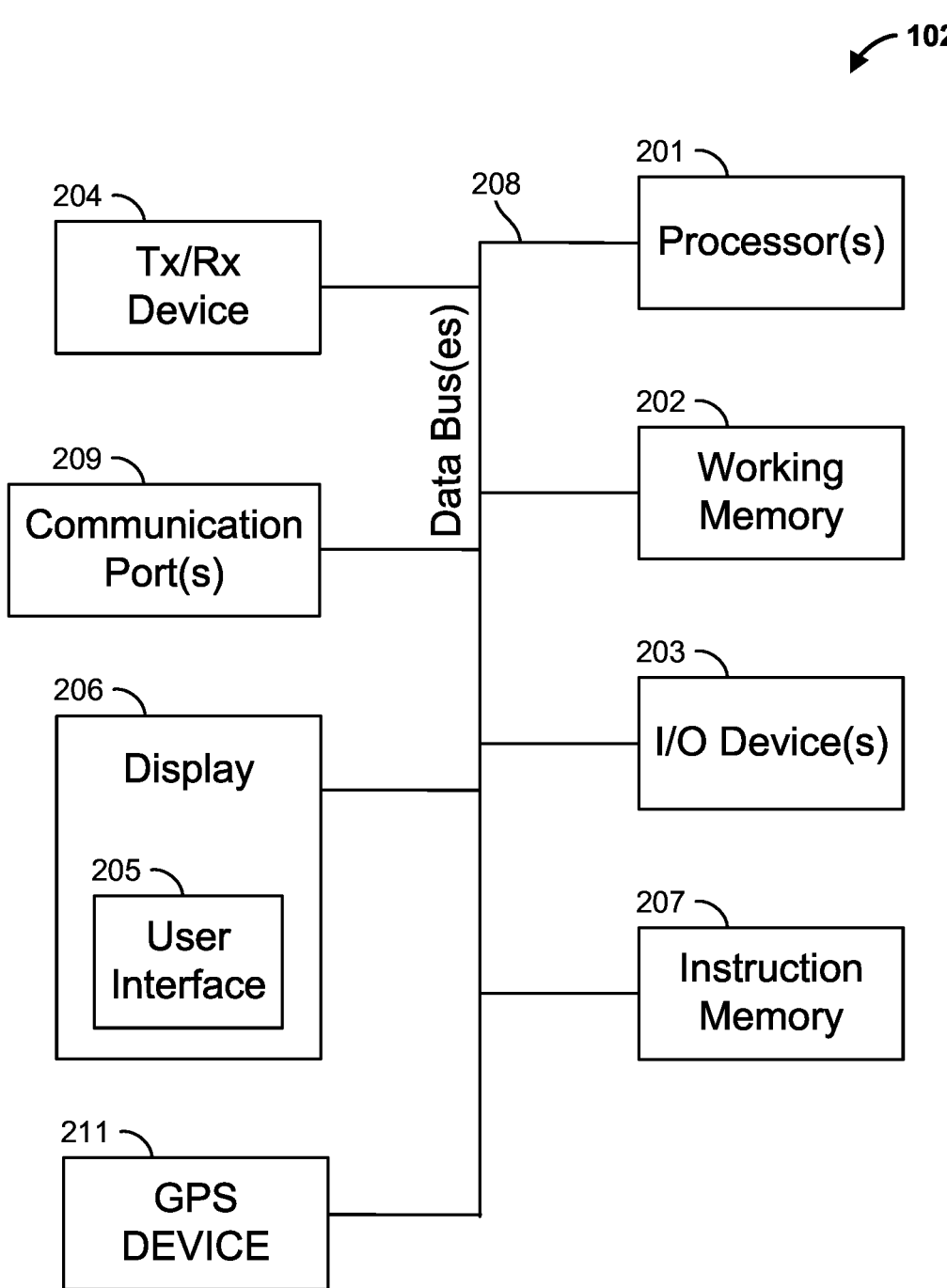
FIG. 2 is a block diagram of the customer insight computing device of FIG. 1 in accordance with some embodiments.

FIG. 2 illustrates the customer insight computing device 102 of FIG. 1. Customer insight computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of customer insight computing device 102. Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with customer insight computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 customer insight computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, customer insight computing device 102 may determine a local geographical area (e.g., town, city, state, etc.) of its position. Based on the geographical area, customer insight computing device 102 may determine relevant trend data (e.g., trend data identifying events in the geographical area).

Figure 3:
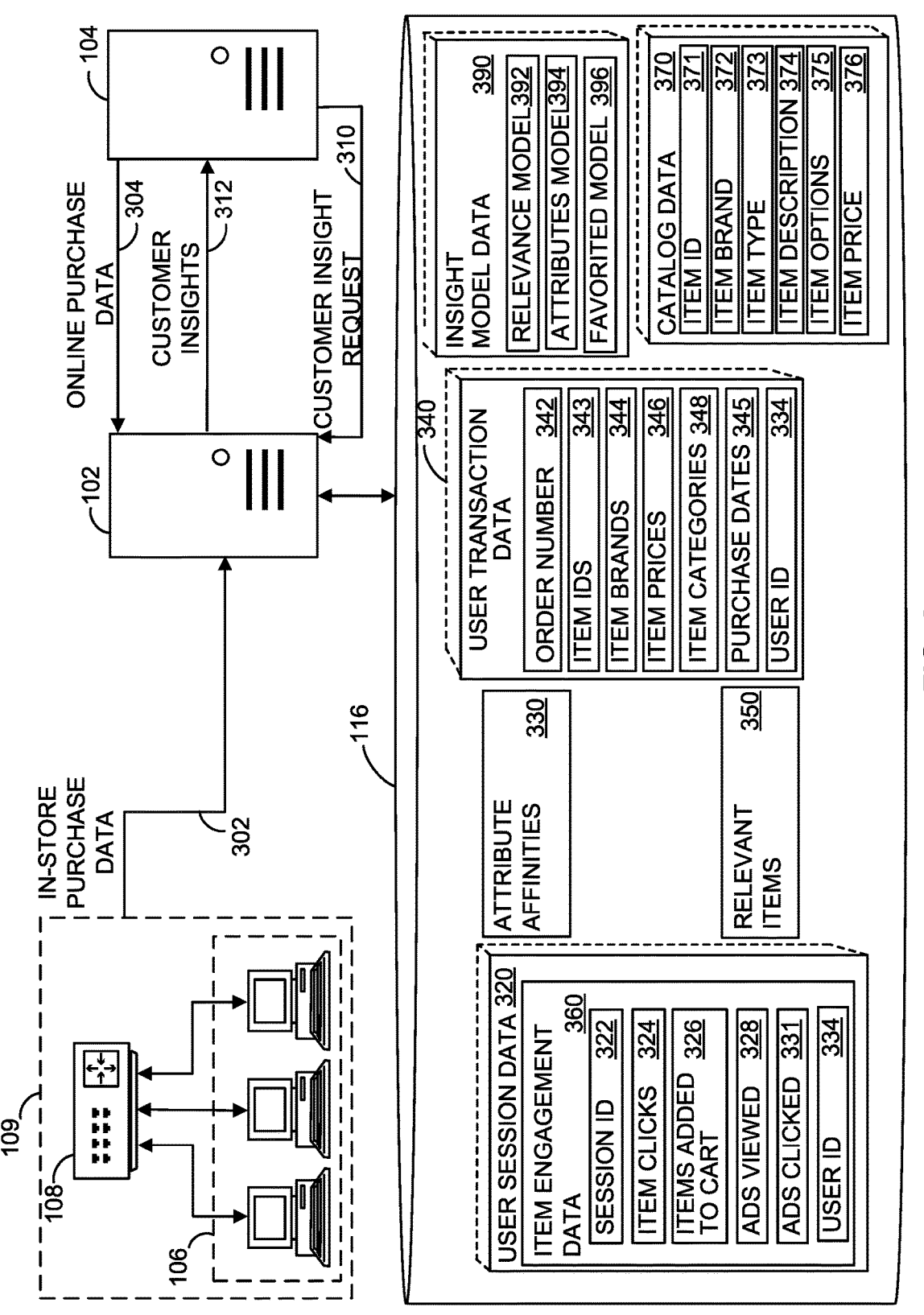
FIG. 3 is a block diagram illustrating various portions of the customer engagement system of FIG. 1 in accordance with some embodiments.

FIG. 3 is a block diagram illustrating examples of various portions of the customer engagement system 100 of FIG. 1. As indicated in the figure, customer insight computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

Customer insight computing device 102 may also receive online purchase data 304 from web server 104, which identifies and characterizes one or more online purchases, such as purchases made by the user via a retailer's website hosted by web server 104. Customer insight computing device 102 may also receive in-store purchase data 302 from store 109, which identifies and characterizes one or more in-store purchases including item identifiers and prices.

Customer insight computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item types 348 identifying a type (e.g., category) of each item purchased, a purchase date 345 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., milk, chops, pasta, laptops, rugs, television stands, etc.), item description 374 (e.g., a description of the product including product features, such as ingredients, benefits, use or consumption instructions, or any other suitable description), item options 375 (e.g., item colors, sizes, flavors, etc.), and item price 376 (e.g., the retail price of the item). In some examples, catalog data 370 may identify, for at least some of the plurality of items, an item flavor, an item size, an item nutrition fact(s), an item color, etc. In some examples, item description 374 may be parsed to determine one or more of the item flavor, item size, item nutrition fact(s), item color, etc., for each of the plurality of items.

Additionally, database 116 may store relevant item types 350, which may identify and categorize item types relevant to the customer. Each item type may also be associated with corresponding relevancy score indicating a relevancy of the item type to the particular customer. The relevant item types 350 may be determined using relevance model 392 also stored in database 116. Relevance model 392 may determine relevant item types 350, and their corresponding scores for the customer based on user session data 320 and/or user transaction data 340. Any known relevancy model may be used to determine the relevant item types 350 and their corresponding scores for each user and/or each user session. Relevant item types 350 may include data indicating a set of relevant item types that are determined to be relevant to the user based on the user transactional data 340 and/or user session data 320 associated with past user sessions, as determined by relevance model 392. In some examples, the relevant item types 350 may include product types that determined to be most relevant to the corresponding user based on the historical user data, as indicated by the user session data 320 and/or user transaction data 340.

Database 116 may also store attribute affinities 330, which may identify and categorize product or item attributes relevant to the customer. Each attribute may also be associated with corresponding affinity score indicating a relevancy of the attribute of the corresponding product to the particular customer. The attribute affinities 330 may be determined using attributes model 394 also stored in database 116. Attributes model 394 may determine relevant attributes, and their corresponding scores for the customer based on user session data 320 and/or user transaction data 340. Any known affinity model and/or relevancy may be used to determine the attribute affinities 330 for each attribute of a product for each user. Attribute affinities 330 may include data indicating a set of attributes for a corresponding set of products within associated product types that are determined to be relevant to the user based on the user transactional data 340 and/or user session data 320 associated with past user sessions, as determined by attributes model 394. In some examples, the attribute affinities 330 may include attributes of corresponding products that determined to be most relevant to the corresponding user based on the historical user data, as indicated by the user session data 320 and/or user transaction data 340. In some examples, attributes model 394 may use an attribute extractor that may be trained to represent semantically same attribute values in a standardized manner across various products and/or similar products and product types in the catalog data 370. A machine learning model may be used as a feature extractor that clusters semantically similar values together.

Database 116 may also store insights model data 390 identifying and characterizing one or more machine learning models. For example, insights model data 390 may include the relevance model 392, an attributes model 394, and a favorites model 396. Each of the relevance model 392, attributes model 394, and favorites model 396 may be one or more machine learning models trained based on corresponding tensors (e.g., embedding vectors, feature vectors) generated by customer insight computing device 102.

In some examples, customer insight computing device 102 receives (e.g., in real-time) a customer insight request 310 for a customer with a history of interacting with a website hosted by web server 104. In response, customer insight computing device 102 determines whether the customer is a previously engaged customer that has been inactive for a threshold period of time. In response to determining that the customer is a previous engaged customer that has been inactive for the threshold period of time, customer insight computing device 102 generates customer insights 312 identifying customer insights and/or favorites to present to the customer, and transmits customer insights 312 to web server 104. In other examples, customer insight computing device 102 receives a customer insight request 310 from the web server 104 from a customer interacting with a website hosted by web server 104, via a notification link sent to the customer's email. In response, customer insight computing device 102 generates customer insights 312 identifying learner customer preferences and favorites to advertise to the customer, and transmits customer insights 312 to web server 104 to present to the customer via an email notification and/or via the webpage hosted by web server 104. In some examples, customer insight computing device 102 periodically determines whether to generate customer insights for the customer based on a set criteria. The set criteria, in some examples include, whether the customer is a previously engaged customer and/or whether the customer has been inactive on the retailer's platform(s) for a set period of time (e.g., past ten days).

For example, customer insight computing device 102 may assign each of the relevance model 392, attributes model 394, and favorites model 396 (or parts thereof) to a different processing unit or virtual machines hosted by one or more processing devices 120. Moreover, customer insight computing device 102 may generate tensors based at least on the user transaction data 340 (e.g., the user transaction data 340 from prior or historical user sessions) for the user as required by each of the relevance model 392, attributes model 394, and favorites model 396. In some examples, customer insight computing device 102 generates the tensors based on one or more of the following: historical user session data 320 for the customer, historical user transaction data 340 for the customer, relevant item types 350, and attribute affinities 330, for each of the relevance model 392, attributes model 394, and favorites model 396. Customer insight computing device 102 may provide (e.g., transmit) the tensors to the processing units accordingly, and the processing units may execute the models based on the provided tensors (e.g., inferencing).

Further, customer insight computing device 102 may obtain the output (e.g., output data, output tensors) of each of the relevance model 392, attributes model 394, and favorites model 396 from the processing units, and generate the customer insights 312 based on the outputs of the models. For example, customer insight computing device 102 may use favorites model 396 to manipulate the output of the relevance model 392 and the attributes items 330 to rank attributes and product type pairs based on the scores for the relevant item types 350 and the attribute affinities 330 for the corresponding attributes of the relevant item types to generate the customer insights. The favorites model 396 may determine customer preferences and favorites as attribute and product type pairs (or parts thereof) to present to the user as customer insights 312 based on a combination of the model outputs. The customer insights 312 may then be generated as the combination of the model outputs.

Figure 4:
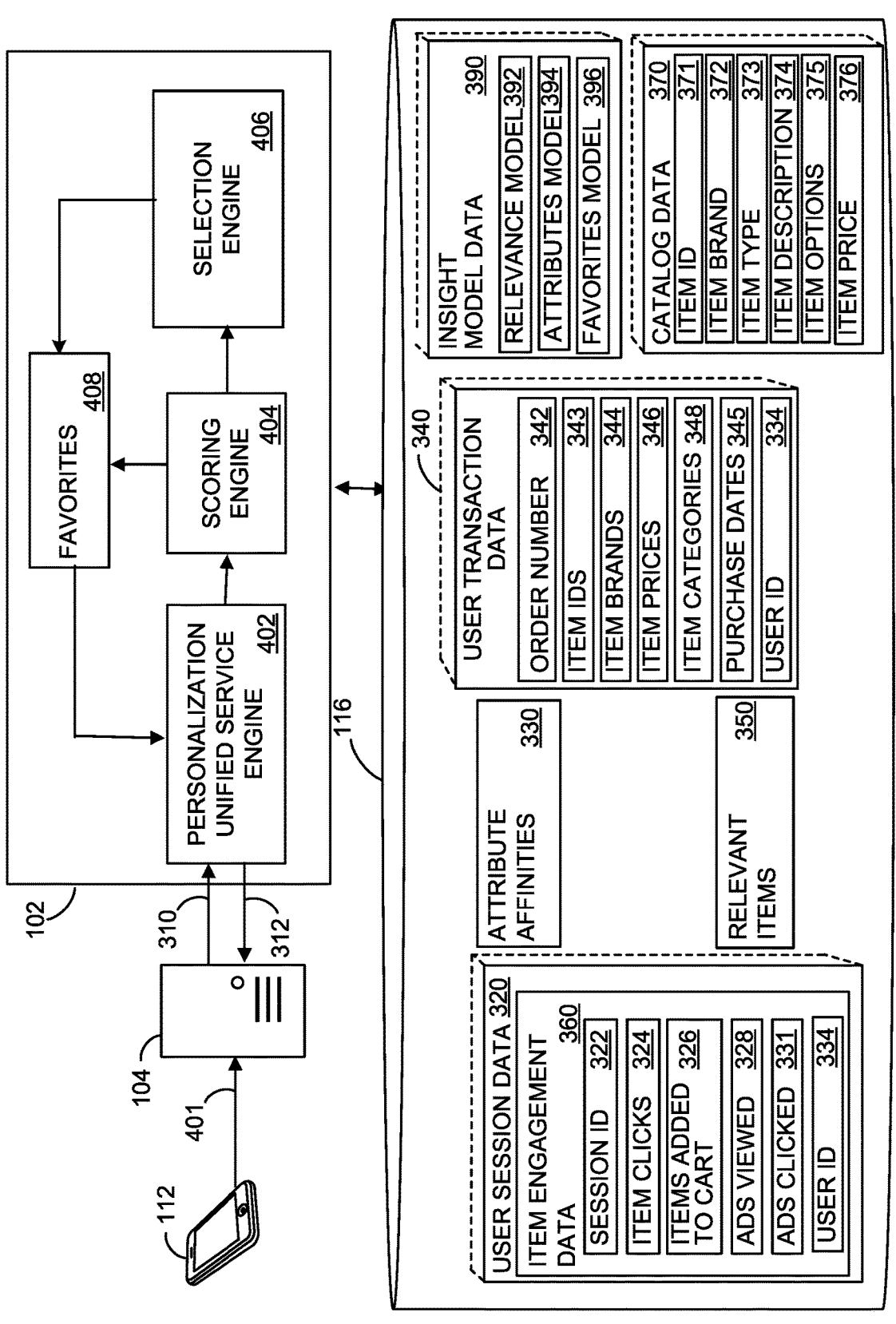
FIG. 4 is a block diagram illustrating various portions of the customer insight computing device of FIG. 1 in accordance with some embodiments.

FIG. 4 is a block diagram illustrating a more detailed view of customer insight computing device 102. Specifically, customer insight computing device 102 includes personalization unified service engine 402, scoring engine 404, and selection engine 406. In some examples, one or more of personalization unified service engine 402, scoring engine 404, and selection engine 406 are implemented in hardware. In some examples, one or more of personalization unified service engine 402, scoring engine 404, and selection engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain customer insight request 310 as a message 401 from user device 112 via web server 104 and may execute insights model(s) included in the recommendation model data 390. In another example, personalization unified service engine 402 may automatically generate a customer insight request on behalf of a customer based on meeting a set criteria.

In this example, web server 104 transmits a customer insight request 310 to customer insight computing device 102. Customer insight request 310 may include a request for customer preferences, recommendations, and/or favorites for presentation to a particular user using the user device 112, via a retailer's webpage or an email sent to the user's email. In some examples, customer insight request 310 further identifies a user (e.g., customer) for whom the customer insights (e.g., preferences, recommendations, favorites, etc.) are requested at web server 104. Personalization unified service engine 402 receives customer insight request 310, and receives and parses the user session data 320 and/or user transaction data 340 as stored in database 116. Personalization unified service engine 402 provides the user session data 320 and/or the user transaction data 340 to the scoring engine 404, and selection engine 406, and other data, which may include, catalog data 370, relevant item types 350, and attribute affinities 330 extracted from database 116.

Scoring engine 404 can determine one or more pairs of attributes and product types and their associated scores (e.g., ranks) based on the user session data 320, the user transaction data 340, catalog data 370, attribute affinities 330, and relevant item types 350. Scoring engine 404 may use relevance model 392 and the attributes model 394 to determine the pairs of attributes and product types and their associated scores based on the user's historical purchase and/or session data for the particular user of user device 112, attribute affinities 330, relevant item types 350, and catalog data 370 extracted from the database 116 for the particular user. In some examples, scoring engine 404 may further use a thresholding algorithm to threshold the number of pairs included and scored. Scoring engine 404 generates ranked (e.g., scores) pairs of attributes and product types, identifying and characterizing affinities of attributes of corresponding product types to the user, as determined to be relevant to the user. Scoring engine 404 may provide the pairs of attributes and product types (e.g., with corresponding scores) to selection engine 406.

Selection engine 406 can determine favorites 408 to be used for final customer insights 312 based on the scores associated with the pairs of attributes and product types. Selection engine 406 may select one or more attributes and product type pairs from the potential pairs received from scoring engine 404 to generate the customer insights 312. Selection engine 406 may determine a set number of top ranked (e.g., top five) attribute and product type pairs to be included in favorites 408. Favorites 408 may be generated by selection engine 406 for generating customer insights 312. Favorites 408 may be the selected attribute and product type pairs, their corresponding scores, and/or other statistics associated with the pairs as delineated from user session data 320 and user transaction data 340.

Favorites 408 can be used to determine a format for customer insights 312 based on the selected attribute and product type pairs received from the selection engine 406. Favorites 408 may generate data that identifies the data associated with the pairs and a corresponding format for customer insights 312 associated with the particular user (e.g., customer) to optimize user interactions with and user purchases of items from the retailer's platforms.

Personalization unified service engine 402 may receive the customer insights 312 from the favorites 408 in a data format (e.g., message) acceptable by web server 104. Personalization unified service engine 402 transmits the customer insights 312 to web server 104. Web server 104 may then update or generate customer insights for presentation to the user via the user device 112 based on the favorites 408 using the webpage or via an email notification. In some examples web server 104 may update or generate customer insights for presentation to the user within a customer profile associated with the user. In some other examples, customer insight computing device 102 may transmit customer insights 312 and/or favorites 408 to database 116 for storing in associated with the user as customer's preferences with regards to pairs of attribute and product types (e.g., user brand preferences, dietary preferences, flavor preferences, price preferences, etc.).

Figure 5A:
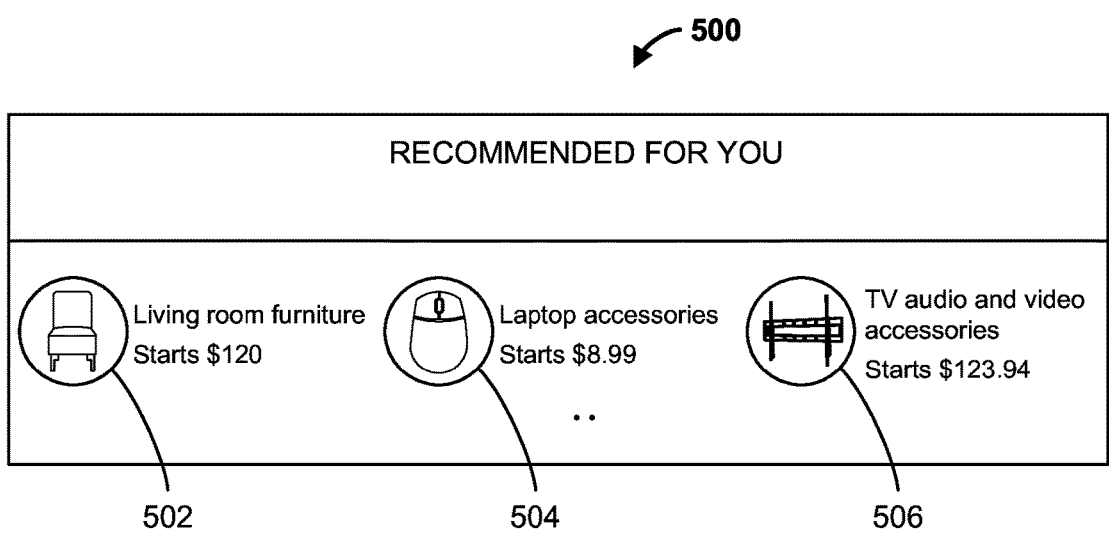
FIGS. 5A-5D are illustrations showing examples of customer insights presented to the user based on the attribute and product type pairs generated by customer insight computing device of FIG. 1 in accordance with some embodiments.

FIGS. 5A-5D are illustrations showing examples of customer insights presented to the user based on the attribute and product type pairs generated by customer insight computing device 102 of FIG. 1. Referring to FIG. 5A, FIG. 5A illustrates an example customer insight 500 presented to a customer based on customer insights 312. In some examples, customer insights may include product types associated with the generated favorites 408. Customer insight 500 may indicate recommended product types 502, 504, and 506 for the user. The product types 502, 504 and 506 may be the top three product types in the pairs of attribute and product types determined to be most relevant to the user in favorites 408. For example, product type 502 may the highest scoring product type (e.g., "living room furniture") of the pairs of attributes and product types in favorites 408, product type 504 may be the second highest scoring product type (e.g., "laptop accessories") of the pairs of attributes and product types, and product type 506 may be the second highest scoring product type (e.g., "TV audio and video accessories") of the pairs of attributes and product types. In some examples, the product types 502, 504, 506 may be linked to one or more products within the corresponding product type which may in turn be positioned based on the highest ranked attributes within that product type.

Figure 5B:
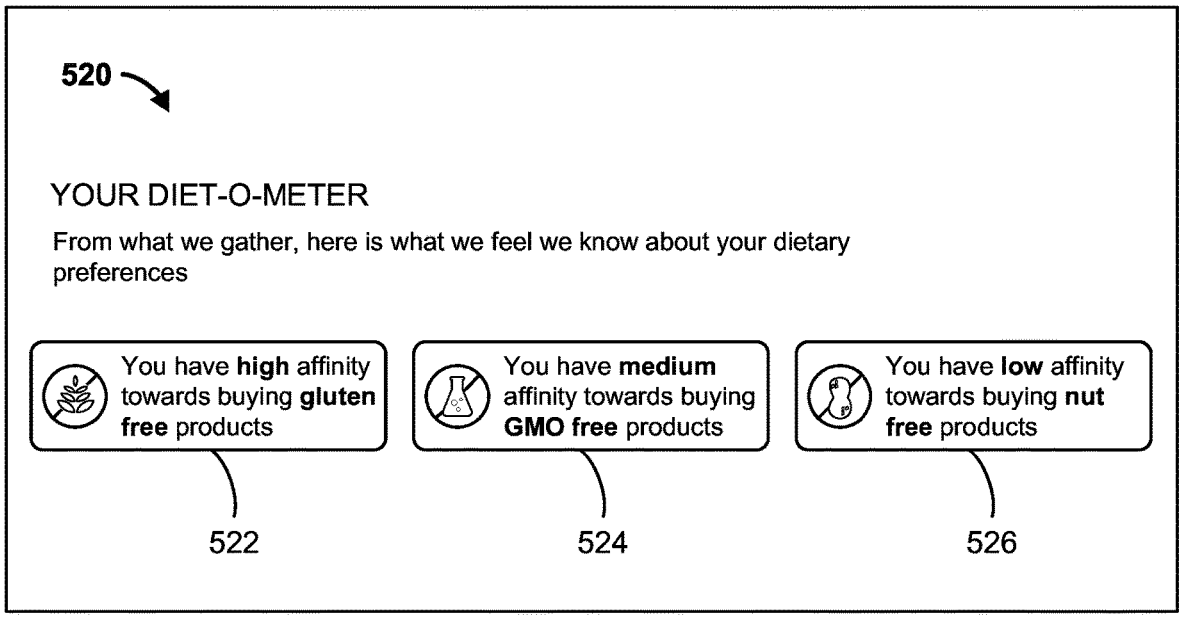

Referring now to FIG. 5B, FIG. 5B illustrates another example presentation customer insights 520 for the user. As shown in FIG. 5B, the user's dietary preferences may be determined by customer insight computing device 102. Based on product type "food items," the scores may be generated for different dietary preferences and food item pairs 522, 523, 526. For example, customer insight computing device 102 may determine that the user scores over a predetermined threshold for high affinity towards the attribute and product type pair of "gluten free" and "food items" based on the user's historical purchase and session data. Based on that, customer insight 312 may be presented in format 522, stating that the user has "high affinity towards buying gluten free products." Similarly, customer insight computing device 102 may determine that the user scores within a predetermined threshold for medium affinity towards an attribute and product type pair of "GMO free" and "food items" based on the user's historical purchase and session data. Based on that, customer insight 312 may be presented in format 524, stating that the user has "medium affinity towards buying GMO free products." As another example, customer insight computing device 102 may determine that the user scores below a predetermined threshold for medium affinity towards an attribute and product type pair of "nut free" and "food items" based on the user's historical purchase and session data. Based on that, customer insight 312 may be presented in format 526, stating that the user has "low affinity towards buying nut free products." In this way, the user may be presented with statistics (e.g., "high," "medium," "low," etc.) for dietary preferences (e.g., gluten free products, GMO free products, nut free products, etc.) for the product type (e.g., food items) as determined based on the user's historical transaction, purchase and/or engagement data.

Figure 5C:
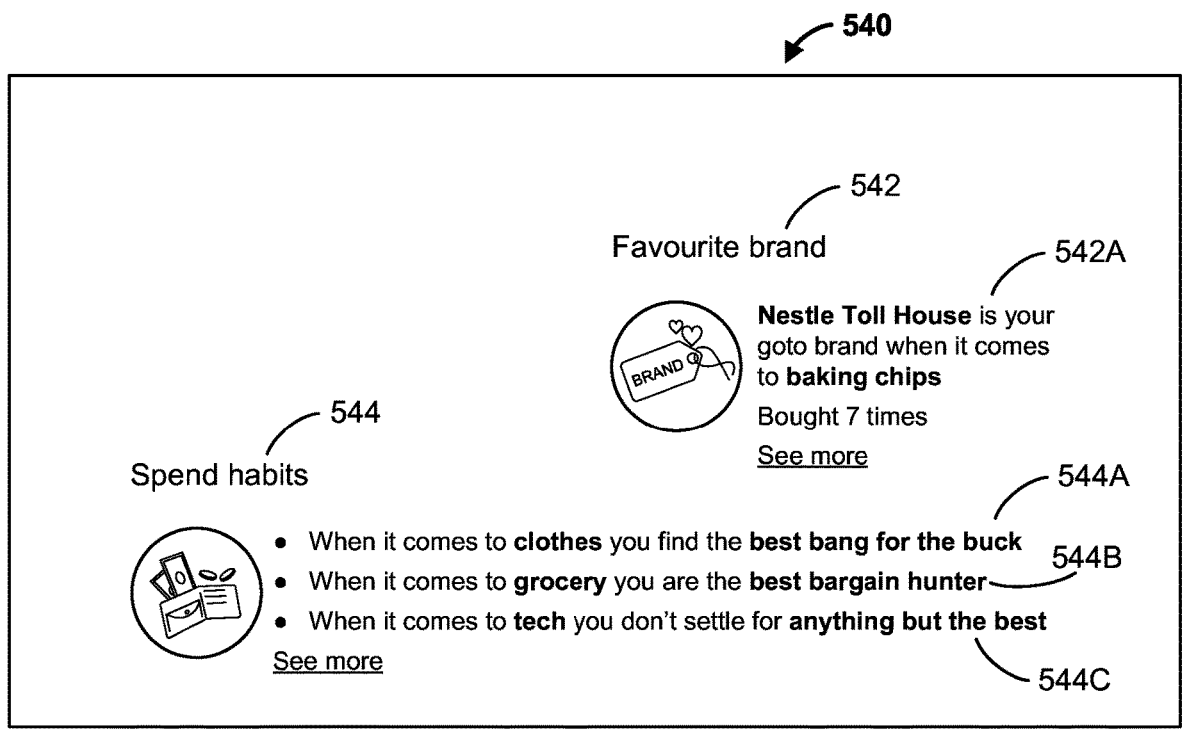

FIG. 5C illustrates an example customer insights 540. For example, customer insight 540 may include an attribute, "brand," with attribute value, "Nestle Toll House," for product type, "baking chips," for the user. In this example, customer insight computing device 102 may have determined a pair 542A of attribute (e.g., "Nestle Toll House") and product type (e.g. "baking chips") to be included in customer insights 312. The format for a brand-product type pair may be determined as "Nestle Toll House is your goto brand when it comes to baking chips." In some examples, a statistics may be included, such as but not limited to, a number of times the combination of product type and brand was purchased by the customer in the past (e.g., "bought 7 times"). Another customer insight 544 may be presented to the user that includes spending habits as delineated from the historical user data. For example, attribute, "price" and product type "clothes" may be a pair determined to be relevant to the user. Customer insight computing device 102 may determine that for price-clothes pair, the customer shops for the lowest prices or from discounted items. As such, the customer insight 544A may be presented to the user as indicating that "[w]hen it comes to clothes you find the best bang for the buck" based on a format for the price-clothes pair. Similarly, for a price-grocery attribute and product type pair, customer insight 544B may be presented to indicate that the user tends to find bargains or lower prices when it comes to shopping for groceries. As another example, for a price-technology attribute and product type pair, customer insight 546 may be presented to indicate that the customer tends to buy the best products when it comes to shopping for technological products.

Figure 5D:
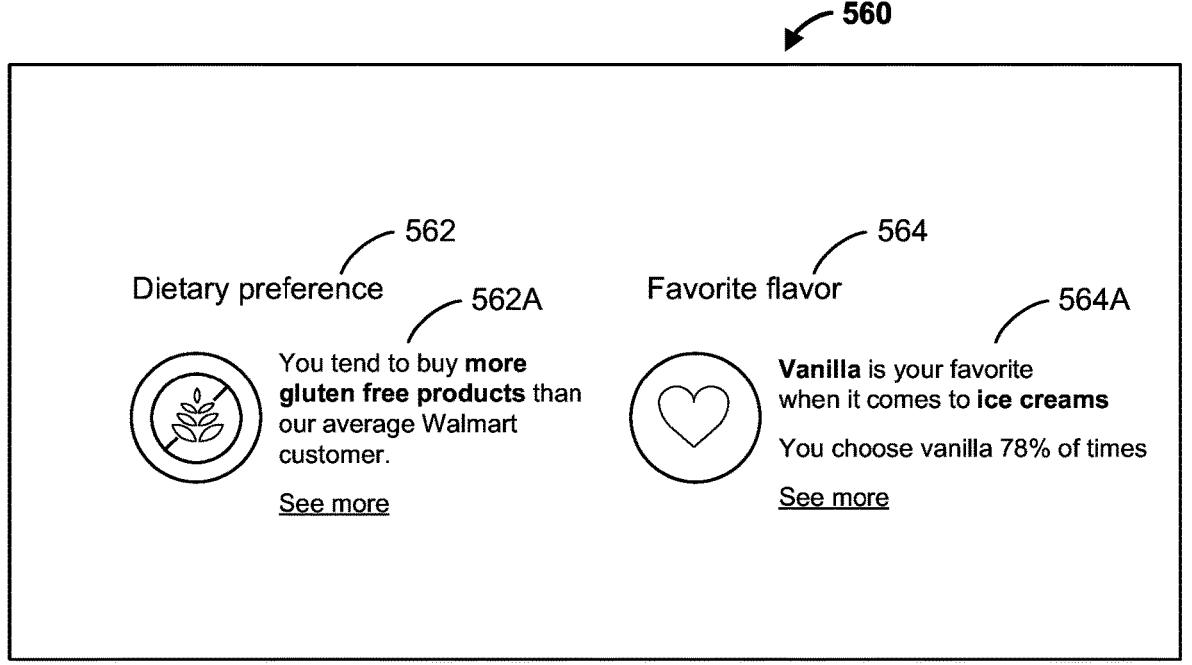

Now referring to FIG. 5D, FIG. 5D includes example customer insights 560 that may be presented to a customer. In some examples, dietary preference 562 may be presented to the user when customer insight computing device 102 determines that for product type, "food items," the customer has an affinity towards buying more items with attribute, "gluten free." In such an instance customer insight computing device 102 may further determine that the customer has a higher affinity towards buying gluten free products than other customers based on comparing the number of times the customer has bought gluten free food items as compared to other customers of the retailers. Dietary preference 562 may then be presented in the predetermined format 562A to indicated that the customer "tend(s) to buy more gluten free products than [ ] average [ ] customer." As another example, favorite flavor 564 customer insight may be presented to a user when the customer insights 312 includes an attribute and product type pair of vanilla flavor-ice cream. Favorite flavor 564 may then be presented in the predetermined format 564A to indicate that "vanilla" is the customer's "favorite [flavor] when it comes to ice creams." Further, customer insight computing device 102 may determine that the customer has bought vanilla flavored ice creams a set percentage (e.g., 78%) of times that the customer has bout ice cream. It should be understood that the illustrations in FIGS. 5A-5D are for illustration purposes only and any other presentation schemes as well as insights may be used.

FIG. 6 is a flowchart of an example 600 that can be carried out by the customer engagement system 100 of FIG. 1. Beginning at step 602, user data associated with a user is obtained from a database. For example, customer insight computing device 102 may receive user data, including user session data 320 and user transaction data 340 associated with a user from database 116. At step 604, a plurality of product types are obtained based on the user data. Each product type is associated with a relevance score for the user. For example, relevant item types 350 are obtained from database 116. The relevant item types 350 may include product types relevant to the user, each relevant product type may have a corresponding relevance score for the user determined based on the user data.

At step 606, for each product type of the plurality of product types, a set of attributes associated with the product type are obtained. Each attribute is associated with an affinity score for the user. For example, attribute affinities 330 are obtained from database 116. The attribute affinities 330 may include attributes associated with each product type, each attribute may be associated with an affinity score based on the user data.

At step 608, for each product type of the product types and for each attribute of the set of attributes, an overall score for the attribute and product type pair is determined based on the relevance score for the product type and the affinity score for the corresponding attribute. For example, scoring engine 404 may determine an overall score each attribute and product type pair based on the relevance score of the product types as stored in relevant item types 350 and the affinity scores for corresponding attributes stored in attribute affinities 330.

At step 610, at least one attribute and product type pair is selected for presentation based on the corresponding overall score. For example, selection engine 406 may generate customer insights 312 based on favorites 408 determined based on the scored attribute and product type pairs for the user. The method then ends.

Figure 7:
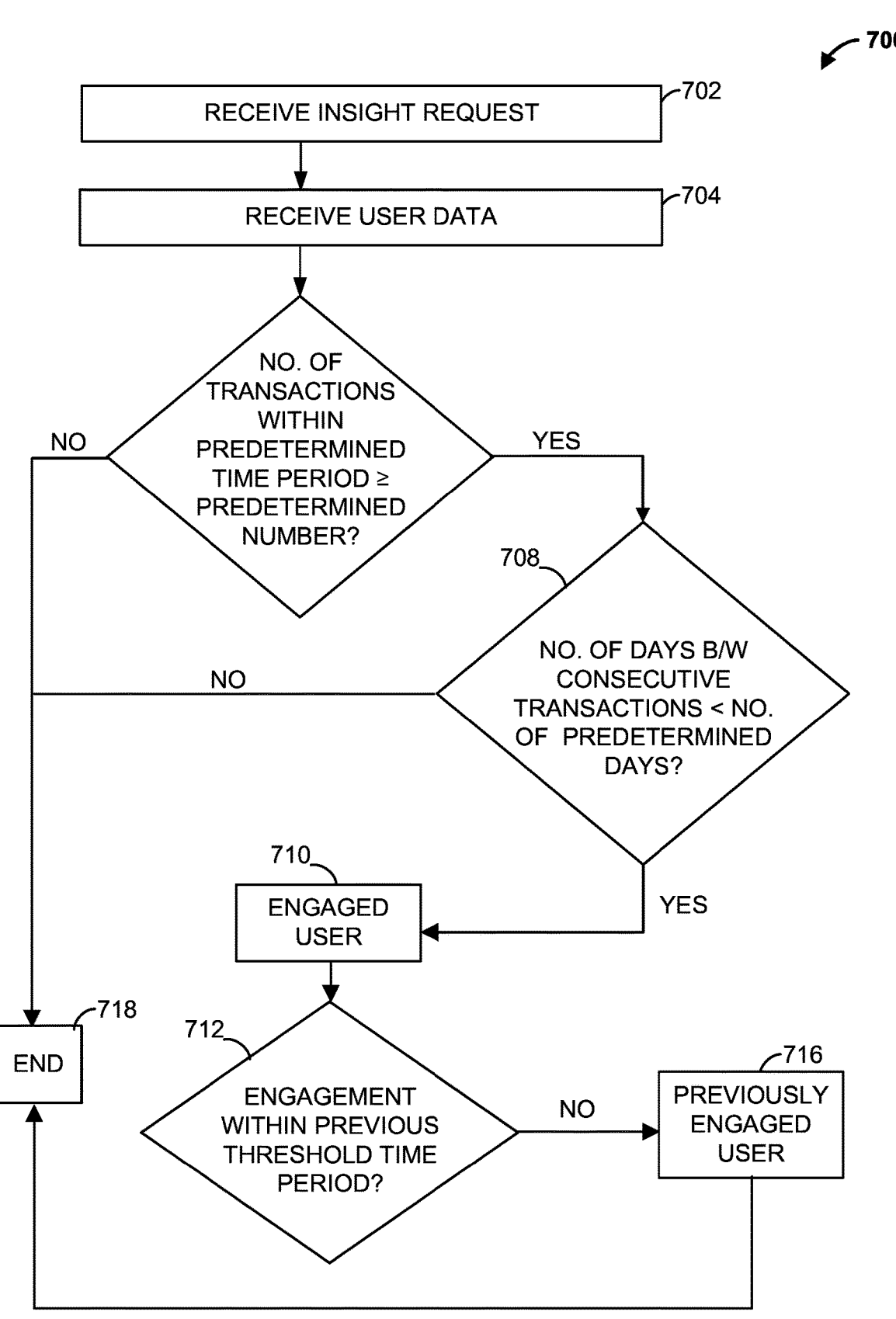
FIG. 7 is a flowchart of another example method that can be carried out by customer insight computing device of FIG. 1 in accordance with some embodiments.

FIG. 7 is a flowchart of an example method 700 that can be carried out by the customer engagement system 100 of FIG. 1. At step 702, a computing device, such as customer insight computing device 102, may receive a customer insight request for a user. For example, customer insight computing device 102 may receive a customer insight request 310 for a user. At step 704, user data associated with the user is received from database 116. For example, customer insight computing device 102 may receive user data including user session data 320 and user transaction data 340 associated with the user from database 116, which stores user session data 320 and user transaction data 340 for a plurality of users.

Proceeding to step 706, it is determined whether the number of transactions associated with the customer within a first threshold period is greater than a predetermined number. For example, customer insight computing device 102 may analyze the user transaction data 340 to determine the number of transactions conducted by the user within a previous threshold time period (e.g., three months) and compare it to a predetermined minimum number of threshold transactions. At step 706, if customer insight computing device 102 determines that the number of transaction within the previous threshold period associated with the user is below the predetermined minimum number, the method ends at step 718.

In the alternative, if customer insight computing device 102 determines that the number of transaction within the previous threshold period associated with the user is equal to or above the predetermined minimum number, the method moves to step 708. At step 708, customer insight computing device 102 determines whether the number of days between any consecutive transactions within the threshold period is over a predetermined number of days. For example, customer insight computing device 102 may analyze the user transaction data 340 to determine number of days between each consecutive transactions within the previous threshold time period (e.g., three months) and compare each of them to a predetermined maximum number of days (e.g., ten days). At step 708, if customer insight computing device 102 determines that the number of number of days between any consecutive transactions is above the predetermined maximum number of days, the method ends at step 718.

Alternatively, if, at step 708, customer insight computing device 102 determines that the number of number of days between any consecutive transactions is equal to or below the predetermined maximum number of days, at step 710, the user is determined to be an engaged user. For example, when the user meets the predetermined criteria for an engaged user, customer insight computing device 102 may determine that the user is an engaged user.

At step 712, it is determined whether the user has engaged with the retailer's website during a previous time period. For example, customer insight computing device 102 may analyze user session data 320 to determine whether the user has had a session entry or engaged with the retailer's website during a pervious time period (e.g., last ten days). The previous time period may be subsequent to the pervious threshold time period. At step 708, if customer insight computing device 102 determines that the user does have a session entry within the user session data 320 within the previous time period, the method ends at step 718.

However, if customer insight computing device 102 determines that the user does not have a session entry within the user session data 320 within the previous time period, the method moves to step 714 where the user is determined to be a previously engaged user. For example, customer insight computing device 102 may determine that the user has been inactive for the previous time period (e.g., last ten days), in response to which, customer insight computing device 102 may determine that the user is a previously engaged user who is not long active.

At 716, user insights are determined for the determined previously engaged user. For example, customer insight computing device 102 may use method 600 to determine customer insights for the previously engaged user. The method then ends at step 718.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a processor; and
a non-transitory memory storing instructions that, when executed, cause the processor to:
obtain user data associated with a user from a database, wherein the user data includes historical interaction data;
generate a historical interaction set of tensors representative of the historical interaction data;
transmit the historical interaction set of tensors to a plurality of processing units;
determine whether the user data includes a session entry within a predetermined time period;
responsive to determining the user data does not include the session entry within the predetermined time period, in real-time select a plurality of product types relevant to the user based on a relevance score related to each of the plurality of product types for the user;
for each product type of the plurality of product types:
execute an attribute model based on the historical interaction set of tensors, including a machine learning model configured to capture a non-linear relationship, by distributing a plurality of processing tasks to a first processing unit of the plurality of processing units to determine in real-time whether a first attribute of a first product type and a second attribute of a second product type are semantically similar attributes, and, if so, to represent the semantically similar attributes in a manner that reflects their similarity to generate a set of attributes associated with the product type, wherein each attribute in the set of attributes is associated with an affinity score for the user; and
for each attribute of the set of attributes, determine an overall score for an attribute and product type pair, based on the relevance score for the product type and the affinity score for the attribute, wherein the overall score is determined by:
executing a semantic similarity model by distributing a second plurality of processing tasks to the plurality of processing units to generate a first set of tensors representative of a semantic similarity of the plurality of product types;
generating, by a scoring engine, the relevance score for the product type based on the first set of tensors and the user data by executing a relevance model by distributing a third plurality of processing tasks to a second processing unit of the plurality of processing units;
generating a second set of tensors representative of a semantic similarity of the set of attributes based on a universal sentence encoding using the semantic similarity model, wherein the semantic similarity model encodes and embeds the set of attributes;
generating, by the scoring engine, the affinity score for the attribute based on the second set of tensors and the user data; and
combining the relevance score and the affinity score to generate the overall score; and
select for presentation, via a user interface, at least one of the attribute and product type pairs based on the overall score of each of the attribute and product type pairs, and wherein a format of the presentation is based on the at least one of the attribute and product type pairs selected for presentation.

2. The system of claim 1, wherein the user data includes historical user purchase data and historical user engagement data.

3. The system of claim 1, wherein the instructions, when executed, further cause the processor to:
determine a number of transactions within the user data; and
wherein the plurality of product types are obtained based on a determination that the number of transactions is greater than a predetermined threshold number within a predetermined time period.

4. The system of claim 1, wherein the set of attributes includes one more of a brand, a flavor, and a dietary preference.

5. The system of claim 1, wherein the affinity score for each attribute indicates a likelihood of the user buying a product based on the attribute.

6. The system of claim 1, wherein the instructions, when executed, further cause the processor to:

determine, based on the user data, a number of user transactions including a product with the at least one of the attribute and product type pairs selected for presentation; and wherein the number of user transaction is selected for presentation with the at least one of the attribute and product type pairs.

7. A method comprising:

obtaining user data associated with a user from a database, wherein the user data includes historical interaction data;

generating a historical interaction set of tensors representative of the historical interaction data;

transmitting the historical interaction set of tensors to a plurality of processing units;

determining whether the user data includes a session entry within a predetermined time period;

responsive to determining the user data does not include the session entry within the predetermined time period, in real-time selecting a plurality of product types relevant to the user based on a relevance score related to each of the plurality of product types for the user;

for each product type of the plurality of product types:

executing an attribute model based on the historical interaction set of tensors, including a machine learning model configured to capture a non-linear relationship, by distributing a plurality of processing tasks to a first processing unit of the plurality of processing units to determine in real-time whether a first attribute of a first product type and a second attribute of a second product type are semantically similar attributes, and, if so, to represent the semantically similar attributes in a manner that reflects their similarity to generate a set of attributes associated with the product type, wherein each attribute in the set of attributes is associated with an affinity score for the user; and for each attribute of the set of attributes, determining an overall score for an attribute and product type pair based on the relevance score for the product type and the affinity score for the attribute, wherein the overall score is determined by:

executing a semantic similarity model by distributing a second plurality of processing tasks to the plurality of processing units to generate a first set of tensors representative of a semantic similarity of the plurality of product types;

generating, by a scoring engine, the relevance score for the product type based on the first set of tensors and the user data by executing a relevance model by distributing a third plurality of processing tasks to a second processing unit of the plurality of processing units;

generating a second set of tensors representative of a semantic similarity of the set of attributes based on a universal sentence encoding using the semantic similarity model, wherein the semantic similarity model encodes and embeds the set of attributes;

generating, by the scoring engine, the affinity score for the attribute based on the second set of tensors and the user data; and combining the relevance score and the affinity score to generate the overall score; and selecting for presentation at least one of the attribute and product type pairs based on the overall score of each of the attribute and product type pairs, and wherein a format of the presentation is based on the at least one of the attribute and product type pairs selected for presentation.

8. The method of claim 7, wherein the user data includes historical user purchase data and historical user engagement data.

9. The method of claim 7, the method further comprising:

determining a number of transactions within the user data; and obtaining the plurality of product types based at least in part on a determination that the number of transactions is greater than a predetermined threshold within a predetermined time period.

10. The method of claim 7, wherein the set of attributes includes one more of a brand, a flavor, and a dietary preference.

11. The method of claim 7, wherein the affinity score for each attribute indicates a likelihood of the user buying a product based on the attribute.

12. The method of claim 7, the method further comprising:

determining, based on the user data, a number of user transactions including a product with the at least one of the attribute and product type pairs selected for presentation; and selecting for presentation the number of user transaction with the at least one of the attribute and product type pairs.

13. A non-transitory computer readable medium having instructions stored thereon, wherein the instructions, when executed by at least one processor, cause a device to perform operations comprising:

obtaining user data associated with a user from a database, wherein the user data includes historical interaction data;

generating a historical interaction set of tensors representative of the historical interaction data;

transmitting the historical interaction set of tensors to a plurality of processing units;

determining whether the user data includes a session entry within a predetermined time period;

responsive to determining the user data does not include the session entry within the predetermined time period, selecting in real-time a plurality of product types relevant to the user based on a relevance score related to each of the plurality of product types for the user;

for each product type of the plurality of product types:

executing an attribute model based on the historical interaction set of tensors, including a machine learning model configured to capture a non-linear relationship, by distributing a plurality of processing tasks to a first processing unit of the plurality of processing units to determine in real-time whether a first attribute of a first product type and a second attribute of a second product type are semantically similar attributes, and, if so, to represent the semantically similar attributes in a manner that reflects their similarity to generate a set of attributes associated with the product type, wherein each attribute in the set of attributes is associated with an affinity score for the user; and for each attribute of the set of attributes, determining an overall score for an attribute and product type pair based on the relevance score for the product type and the affinity score for the attribute, wherein the overall score is determined by:

executing a semantic similarity model by distributing a second plurality of processing tasks to the plurality of processing units to generate a first set of tensors representative of a semantic similarity of the plurality of product types;

generating, by a scoring engine, the relevance score for the product type based on the first set of tensors and the user data by executing a relevance model by distributing a third plurality of processing tasks to a second processing unit of the plurality of processing units;

generating a second set of tensors representative of a semantic similarity of the set of attributes based on a universal sentence encoding using the semantic similarity model, wherein the semantic similarity model encodes and embeds the set of attributes;

generating, by the scoring engine, the affinity score for the attribute based on the second set of tensors and the user data; and combining the relevance score and the affinity score to generate the overall score; and selecting for presentation at least one of the attribute and product type pairs based on the overall score of each of the attribute and product type pairs, and wherein a format of the presentation is based on the at least one of the attribute and product type pairs selected for presentation.

14. The non-transitory computer readable medium of claim 13, the operations further comprising:

determining a number of transactions within the user data; and obtaining the plurality of product types based at least in part on a determination that the number of transactions is greater than a predetermined threshold within a predetermined time period.

15. The non-transitory computer readable medium of claim 14, the operations further comprising:

determining, based on the user data, that the user has been inactive for a predetermined minimum threshold of time; and obtaining the plurality of product types based at least in part on the determination that the user has been inactive for the predetermined minimum threshold of time.

16. The non-transitory computer readable medium of claim 13, the operations further comprising:

determining, based on the user data, a number of user transactions including a product with the at least one of the attribute and product type pairs selected for presentation; and selecting for presentation the number of user transaction with the at least one of the attribute and product type pairs.

17. The system of claim 1, wherein the instructions, when executed, further cause the processor to:

determine the overall score for the attribute and product pair type by executing a favorites model by distributing a fourth plurality of processing tasks to a third processing unit of the plurality of processing units.

18. The system of claim 1, wherein the machine learning model of the attribute model includes a neural network.

19. The method of claim 7, further comprising:

determining the overall score for the attribute and product pair type by executing a favorites model by distributing a fourth plurality of processing tasks to a third processing unit of the plurality of processing units.

20. The method of claim 7, wherein the machine learning model of the attribute model includes a neural network.

* * * * *